US009925508B2

(12) United States Patent
Lacroix et al.

(10) Patent No.: US 9,925,508 B2
(45) Date of Patent: Mar. 27, 2018

(54) CATALYTIC CRACKING SPRAY NOZZLE WITH INTERNAL LIQUID PARTICLE DISPERSION RING

(71) Applicants: Spraying Systems Co., Wheaton, IL (US); Technip Process Technology, Inc., Houston, TX (US)

(72) Inventors: Mark Lacroix, Thornton, NH (US); Eusebius Anku Gbordzoe, Houston, TX (US); Chris Robert Santner, Houston, TX (US)

(73) Assignees: Spraying Systems Co., Wheaton, IL (US); Technip Process Technology, Inc., Houston, TX (US)

( * ) Notice: Subject to any disclaimer, the term of this patent is extended or adjusted under 35 U.S.C. 154(b) by 0 days.

(21) Appl. No.: 15/036,238

(22) PCT Filed: Oct. 3, 2014

(86) PCT No.: PCT/US2014/059102
§ 371 (c)(1),
(2) Date: May 12, 2016

(87) PCT Pub. No.: WO2015/073133
PCT Pub. Date: May 21, 2015

(65) Prior Publication Data
US 2016/0288075 A1    Oct. 6, 2016

Related U.S. Application Data

(60) Provisional application No. 61/902,848, filed on Nov. 12, 2013.

(51) Int. Cl.
*C10G 11/18* (2006.01)
*B01J 8/18* (2006.01)
(Continued)

(52) U.S. Cl.
CPC ............... *B01J 8/24* (2013.01); *B01J 8/1827* (2013.01); *B05B 1/044* (2013.01); *B05B 1/046* (2013.01);
(Continued)

(58) Field of Classification Search
CPC ......... B05B 1/044; B05B 1/046; B05B 1/265; B05B 7/0012; B05B 7/0416;
(Continued)

(56) References Cited

U.S. PATENT DOCUMENTS 742,965 A * 11/1903 Brunner ................. E03C 1/084
239/427
3,693,886 A     9/1972 Conrad
(Continued)

FOREIGN PATENT DOCUMENTS

CN      101495239 A    7/2009
EP       0271316 A2    6/1988

OTHER PUBLICATIONS

European Search Report dated Mar. 27, 2017, in European Patent Application No. 14862994.2.
(Continued)

*Primary Examiner* — Darren W Gorman
(74) *Attorney, Agent, or Firm* — Leydig, Voit & Mayer, Ltd.

(57) ABSTRACT

A gas assisted spray nozzle assembly having a nozzle body in the form of a hollow tubular member, such as a single cylindrical pipe section, which defines a mixing zone and a downstream barrel extension zone. A liquid inlet and an impingement pin are supported by the tubular member in opposed relation to each other at the mixing zone, and a pressurized gas inlet is provided at an upstream end of the tubular member. An annular dispersion ring is fixedly supported within the tubular member downstream of the
(Continued)

impingement pin for defining an annular ledge for directing a peripheral portion of pressurized gas stream and liquid atomized in the mixing zone radially inwardly for facilitating continued intermixing of the liquid and pressurized gas stream as they proceed through the barrel zone for discharge from the spray nozzle.

11 Claims, 2 Drawing Sheets

(51) Int. Cl.
  *B05B 7/04* (2006.01)
  *B05B 7/00* (2006.01)
  *B01J 8/24* (2006.01)
  *B05B 1/04* (2006.01)
  *B05B 1/26* (2006.01)
(52) U.S. Cl.
  CPC .......... *B05B 7/0012* (2013.01); *B05B 7/0483* (2013.01); *C10G 11/18* (2013.01); *B01J 2208/00902* (2013.01); *B05B 1/265* (2013.01)
(58) Field of Classification Search
  CPC ... B05B 7/0458; B05B 7/0466; B05B 7/0483; B05B 7/0491; B01J 8/1827; B01J 8/24; B01J 2208/00902; C10G 11/18
  USPC ..... 239/8, 427, 432–434; 208/113; 422/139, 422/140
  See application file for complete search history.

(56) References Cited

U.S. PATENT DOCUMENTS

| | | | | |
|---|---|---|---|---|
| 3,867,092 | A | * | 2/1975 | Sage ..................... F23D 11/102 239/431 |
| 4,434,049 | A | * | 2/1984 | Dean ..................... C10G 11/18 208/113 |
| 4,591,099 | A | | 5/1986 | Emory et al. |
| 4,815,665 | A | | 3/1989 | Haruch |
| 4,828,182 | A | | 5/1989 | Haruch |
| 5,176,325 | A | | 1/1993 | Vidusek |
| 5,306,418 | A | | 4/1994 | Dou et al. |
| 5,692,682 | A | | 12/1997 | Soule et al. |
| 6,098,896 | A | | 8/2000 | Haruch |
| 6,726,127 | B2 | | 4/2004 | Hofherr et al. |
| 2002/0159922 | A1 | | 10/2002 | Ito et al. |
| 2007/0290073 | A1 | | 12/2007 | Peterson et al. |
| 2008/0310970 | A1 | | 12/2008 | Fenton et al. |
| 2013/0186982 | A1 | | 7/2013 | Vidusek et al. |

OTHER PUBLICATIONS

First Office Action dated Jul. 6, 2017, in Chinese Patent Application No. 2014800619448.
International Search Report dated Jan. 16, 2015, in International Patent Application No, PCT/US2014/059102.

\* cited by examiner

CATALYTIC CRACKING SPRAY NOZZLE WITH INTERNAL LIQUID PARTICLE DISPERSION RING

CROSS-REFERENCE TO RELATED APPLICATIONS

This patent application claims the benefit of U.S. Patent Application No. 61/902,848, filed Nov. 12, 2013, which is incorporated by reference.

FIELD OF THE INVENTION

The present invention relates generally to spray nozzles, and more particularly, to spray nozzle assemblies particularly adapted for atomizing and spraying a liquid feed to a fluidized catalytic cracking riser reactor.

BACKGROUND OF THE INVENTION

A spray nozzle assembly of the foregoing type is shown and described in U.S. Pat. No. 5,921,472, the disclosure of which is incorporated by reference. Such spray nozzle assemblies typically include a nozzle body which defines a mixing chamber into which a liquid hydrocarbon and pressurized gas, such as steam, are introduced and within which the liquid hydrocarbon is atomized. To enhance liquid atomization within the mixing chamber, an impingement pin extends into the chamber and defines a liquid impingement surface on the center line of the mixing chamber in diametrically opposed relation to the liquid inlet against which a pressurized liquid stream impinges and is transversely dispersed and across which pressurized steam from a gas inlet is directed for further interaction and shearing of the liquid into fine droplets. The atomized liquid within the mixing chamber is directed under the force of the pressurized steam through an elongated tubular barrel, commonly disposed within a wall of the catalytic reactor riser, for discharge from a spray tip at a downstream end thereof within the riser.

The nozzle body, which defines the mixing chamber and receives the impingement pin, a liquid hydrocarbon inlet, and a pressurized steam inlet, is a relatively expensive component of the spray nozzle assembly. The nozzle body commonly is machined from solid metal stock, which due to its complexity, is laborious and time consuming, substantially increasing the cost of the nozzle assembly. For effective operation, it further is required that the atomized liquid hydrocarbon and steam continue to intermix during travel through the elongated barrel of the nozzle assembly without undesirable stratification.

SUMMARY AND OBJECTS OF THE INVENTION

It is an object of the invention to provide a liquid hydrocarbon feed spray nozzle assembly that is relatively simple in construction and lends itself to significantly more economical manufacture.

Another object is to provide a spray nozzle assembly as characterized above in which the nozzle body of the spray nozzle assembly has a simpler and more easy to assemble design and which effectively enhances continued intermixing of atomized liquid hydrocarbon and steam during travel through the elongated barrel of the nozzle assembly.

Other objects and advantages of the invention will become apparent upon reading the following detailed description and upon reference to the drawings, in which:

Figure 1:
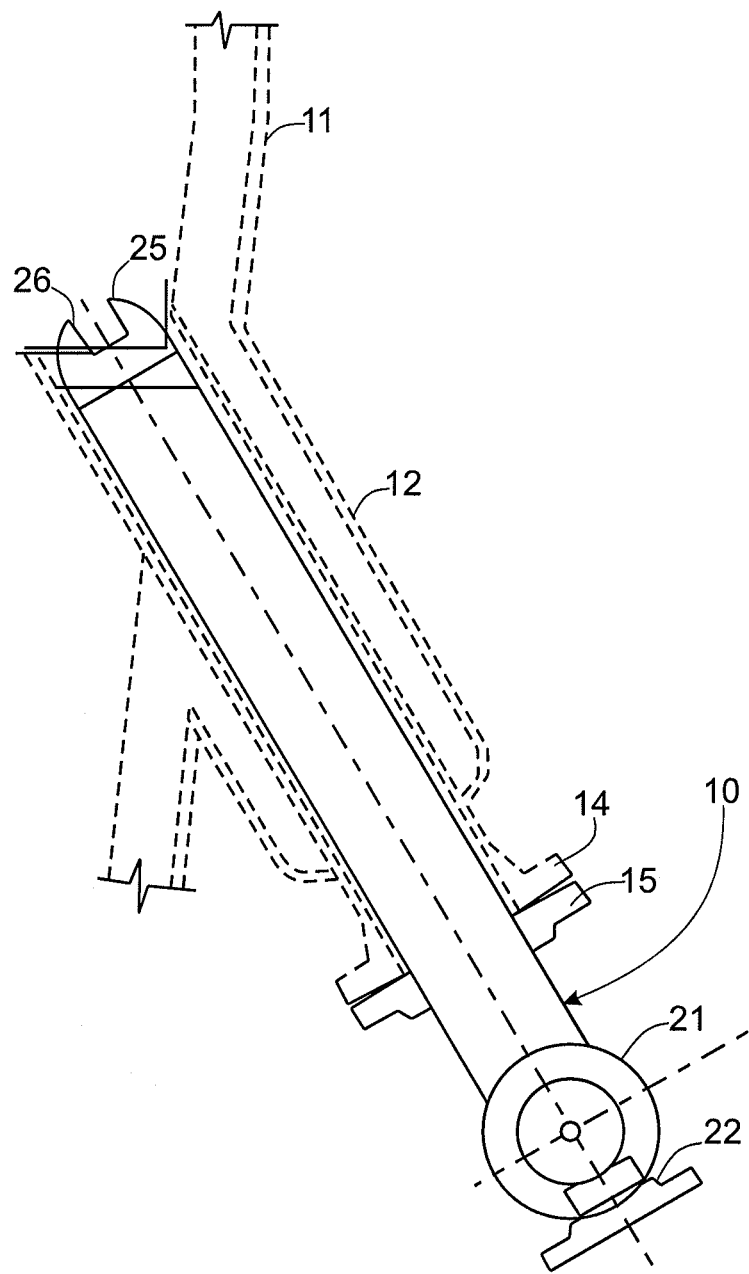
FIG. 1 is a schematic depiction of a spray nozzle assembly in accordance with the present invention mounted within the wall of a riser of a catalytic cracking reactor.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention. In that regard, while the illustrated spray nozzle assembly is particularly effective for atomizing and spraying liquid hydrocarbons in catalytic cracking systems, it will be understood that the utility of the nozzle assembly is not limited to that usage. Also, while the illustrative nozzle assembly is described in conjunction with use of pressurized gas in the form of steam, other pressurized air or gaseous fluids could be used.

DESCRIPTION OF THE PREFERRED EMBODIMENT

Referring now more particularly to the drawings there is shown an illustrative spray nozzle assembly 10 in accordance with the invention mounted in a conventional manner in an insulated wall 11 (shown in phantom) of a riser of a fluidized catalytic reactor. The spray nozzle assembly 10 is supported in a tubular sleeve 12 fixed within the wall 11 at an acute angle to the vertical for discharging atomized liquid hydrocarbon upwardly into the riser. The tubular sleeve 12 has an outwardly extending flange 14 to which a support flange 15 fixed to the spray nozzle assembly 10 may be secured.

Figure 2:
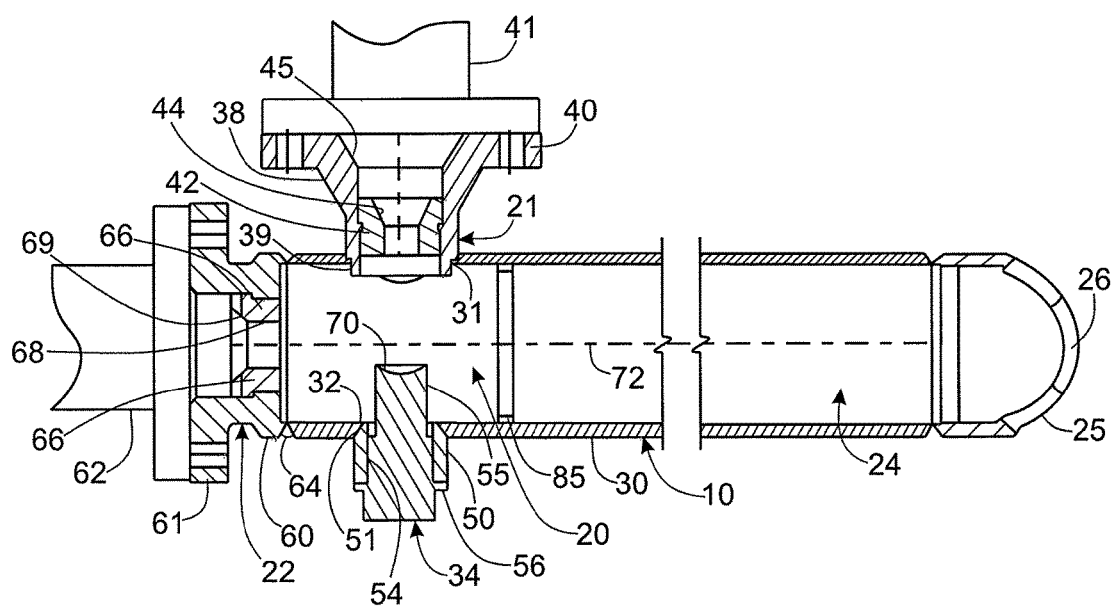
FIG. 2 is an enlarged longitudinal section of the spray nozzle assembly shown in FIG. 1.

The spray nozzle assembly 10, as best depicted in FIG. 2, basically comprises a mixing zone 20 having a liquid hydrocarbon inlet 21 and a pressurized gas inlet, which in this case is a steam or gas inlet 22, disposed on an outer side of the wall 11 of the riser, an elongated barrel extension zone 24 communicating with the mixing zone 20 disposed in and extending through the nozzle support sleeve 12 and riser wall 11, and a spray tip 25 having one or more discharge orifices 26 disposed within the riser for discharging and directing the atomized liquid spray.

In accordance with the invention, the spray nozzle assembly has a relatively simple construction that lends itself to economical manufacture, while being operable for effecting efficient atomization and direction of liquid hydrocarbon feeds in catalytic cracking systems. To this end, in the illustrated embodiment, the mixing zone 20 and barrel zone 24 are defined by a common nozzle body in the form of an uninterrupted cylindrical tubular member 30 which extends substantially the length of the spray nozzle assembly. The tubular member 30 may be a single one piece length of pipe, such as Schedule 80 steel pipe, having an internal diameter of about 2 to 8 inches. The tubular member 30 in this instance has diametrically opposed drilled openings 31, 32 adjacent an upstream end for receiving the liquid inlet 21 and an opposed impingement pin 34, respectively.

The illustrated liquid inlet 21 includes an inlet fitting 38 having a reduced diameter counter bore section 39 that fits within the opening 31, which in this case is formed with an inwardly tapered conical sidewall for facilitating securement of the fitting 38 to the tubular member 30 by an appropriate annular weldment. The liquid inlet fitting 38 has an upstream mounting flange 40 for securement of the fitting 38 to a supply line 41 which in turn is coupled to a suitable liquid hydrocarbon supply. The liquid inlet fitting 38 receives an internally mounted orifice member 42 which defines a liquid inlet flow passage 44 of predetermined diameter through which the feed liquid is directed into the mixing zone 20. The illustrated orifice member 42 and fitting 38, have respective conical entry sections 44, 45 for channeling the feed liquid into and through the orifice member 42.

The impingement pin 34 in this case is in the form of a threaded bolt mounted within an internally threaded bushing or threadolet 50 having an inwardly chamfered end 51 adjacent an inwardly chamfered side of the opening 32 for facilitating welding of the bushing 50 about the opening 32. The impingement pin 34 in this instance has an externally threaded outer section 54 for adjustable threaded engagement with the bushing 50, an inwardly extending cylindrical post section 55 disposed within the tubular member 30, and a head having an outwardly extending flange 56 for fixing the post section 55 in predetermined position within the mixing zone 20 in opposed relation to the liquid inlet 21.

The gas inlet 22, like the liquid inlet 21, includes a fitting 60 having a mounting flange 61 for securement to a supply line 62 coupled to a steam supply and a downstream cylindrical section for securement to an upstream axial end of the tubular member 30. The ends of the steam inlet fitting 60 and the tubular member 30 again are chamfered for facilitating securement by a weldment 64. The steam inlet fitting 60 includes an orifice member 66 for defining a steam inlet passage 68 of predetermined diameter for the pressurized steam with an upstream conical section 69 for channeling steam into and through the inlet passage 68.

The impingement pin 34 in this case is designed for enhancing liquid breakup and atomization by the pressurized steam cross flow with lesser susceptibility to wear and erosion of the impingement pin. To this end, the impingent surface of the pin 34 has an outer impingement surface 70 disposed in radially offset relation to a central axis of the mixing zone 20 on a side of the center line opposite the liquid inlet 21 and has an inwardly recessed configuration for redirecting liquid impinging upon the impingement surface 70 back into the center of the mixing zone for enhanced interaction with the cross flow of pressurized stream for the gas inlet 22. The recessed impingement surface 70 in this case has an inwardly curved spherical configuration. Alternatively, the inward recess of the impingement surface may have a cylindrical configuration with an axis of the cylindrical surface preferably disposed transversely to the central axis 72 of the tubular member 30. In the preferred embodiment, the impingement surface 70 is set back a distance "d" from the central axis of the mixing zone of between $1/8$ and $1/3$ the radius of the mixing chamber, and most preferably about $1/4$ the radius of the mixing zone.

Hence, during operation of the spray nozzle assembly 10, liquid hydrocarbon directed into the mixing zone 20 will pass through the cross flow of pressurized steam directed centrally into the spray nozzle assembly from the gas inlet 22 and engage the recessed impingement surface 70 of the impingement pin 34, which shatters the liquid, disperses it transversely, and redirects it back into the center of the mixing zone 20 for further enhanced liquid particle breakdown and direction under the force of the steam into and through the barrel extension zone 24. With the recessed impingement face 70 in radially removed relation to the axis 72 of the mixing zone 20, the pressurized cross flow of steam enhances liquid particle breakdown with lesser impediment from the impingement pin of the axial flow of steam through the mixing zone and into the barrel zone. The radial set back spacing of the impingement surface 70 with respect to the central axis 72 of the mixing zone 20 further minimizes the direct impact of the stream on the end of the impingement pin 34 and resulting erosion about the impingement surface 70 which can adversely affected spray performance and cause the need for replacement of the impingement pin.

In carrying out a further feature of the present embodiment for enhancing continued intermixing of the atomized liquid and steam during its passage through the barrel extension zone 24 to the spray tip 25, an annular dispersion ring 85 in fixedly disposed between the mixing zone 20 and the barrel zone 24. The cylindrical dispersion ring 85 in this case effectively defines the downstream end of the mixing zone 20 and the upstream end of the barrel extension zone 24. Typically the barrel extension zone 24 has an axial length of 2 to 10 times the axial length of the mixing zone 20. In this case, the annular dispersion ring 85 is positioned an axial distance "l" downstream of the center of the impingement pin 34 less than the diameter of the mixing zone 20, and preferably a distance of about $3/4$ of the diameter of the mixing zone 20.

The illustrated dispersion ring 85 is a metal cylindrical ring having a relatively small radial depth that is welded or otherwise fixed within the tubular member 30. The dispersion ring 85 has a radial depth "x" less than $1/8$ the internal diameter of the pipe, and preferably about $1/10$ the internal diameter. It has unexpectedly been found that the small annular ledge or lip defined by the dispersion ring 85 will direct the peripheral portion of the axial flow of steam and atomized liquid droplets inwardly sufficient to facilitate continued intermixing of the droplets and steam as they proceed the length of the barrel zone 24 and discharge from the spray tip 25. Yet, the small radial depth "x" of the dispersion ring 85 does not undesirably impede the flow of atomized liquid from the mixing zone 20 to the barrel extension zone 24.

From the foregoing, it can be seen that a spray nozzle assembly is provided that is relatively simple in construction and lends itself economical manufacture. Yet the spray nozzle assembly is effective for efficiently atomizing and spraying liquid hydrocarbons in catalytic cracking systems.

The invention claimed is:
1. A catalytic cracking system comprising:
a riser;
a spray nozzle assembly supported within a wall of the riser for discharging atomized liquid hydrocarbon into the riser;
said spray nozzle assembly including a nozzle body which defines a cylindrical mixing zone and an elongated cylindrical barrel extension zone in downstream coaxial communication with the mixing zone,
a liquid hydrocarbon inlet supported by said nozzle body through which a pressurized liquid hydrocarbon stream is directed into said mixing zone,
an impingement pin supported by said nozzle body and extending into said mixing zone having an impingement surface in substantial alignment with the liquid hydrocarbon inlet against which a liquid hydrocarbon stream directed into said mixing zone from said liquid hydrocarbon inlet impinges and is transversely directed;

a steam inlet mounted in an upstream end of said nozzle body through which pressurized steam is directed into said mixing zone along a central axis of the mixing zone for atomizing the liquid hydrocarbon directed into said mixing zone, a spray tip mounted at a downstream end of said barrel extension zone having a discharge orifice through which atomized liquid hydrocarbon is discharged in a predetermined spray pattern, a cylindrical dispersion ring separate from said nozzle body fixedly supported to an inside cylindrical surface of said nozzle body downstream of said impingement pin which defines the end of said mixing zone and the beginning of said barrel extension zone, said dispersion ring defining an annular radial ledge having a radial depth of less than ⅛ the internal diameter of the mixing zone for directing a peripheral portion of the atomized liquid hydrocarbon radially inwardly for continued intermixing of the atomized liquid hydrocarbon as it proceeds through the barrel extension zone for discharge from the spray tip without substantially impeding the flow of atomized liquid hydrocarbon from the mixing zone to and through the barrel extension zone.

2. The catalytic cracking system of claim 1 in which said impingement pin is disposed about midway between the steam inlet and said dispersion ring.

3. The catalytic cracking system of claim 1 in which said dispersion ring has a radial depth of about 1/10 the internal diameter of the nozzle body.

4. The gas catalytic cracking system of claim 1 in which said barrel extension zone has an axial length between 2 and 10 times the axial length of the mixing zone.

5. The catalytic cracking system of claim 1 in which said nozzle body is a one piece section of steel pipe.

6. The catalytic cracking system of claim 5 in which said nozzle body is formed with a first opening adjacent the upstream end thereof that receives said liquid hydrocarbon inlet and a second opening in opposed relation to the first opening for receiving said impingement pin.

7. The catalytic cracking system of claim 1 in which said steam inlet is coupled to a supply of pressurized steam.

8. The catalytic cracking system of claim 1 in which said dispersion ring is positioned an axial distance (L) downstream of a center of the impingement pin less than the diameter of the mixing zone.

9. The catalytic cracking system of claim 8 in which said dispersion ring is positioned an axial distance (L) downstream of a center of the impingement pin a distance of about ¾ of the diameter of the mixing zone.

10. The catalytic cracking system of claim 1 in which said mixing zone and barrel extension zone are cylindrically configured, and said dispersion ring has an inside diameter less than the diameters of said mixing and barrel extension zones.

11. The catalytic cracking system, of claim 1 in which said mixing zone and barrel extension zone are cylindrically configured with similar inside diameters, and said dispersion ring has an inside diameter less than the inside diameters of said mixing and barrel extension zones.

\* \* \* \* \*